United States Patent
Pachet

(10) Patent No.: US 7,886,229 B2
(45) Date of Patent: Feb. 8, 2011

(54) CONTENT-MANAGEMENT INTERFACE

(75) Inventor: Francois Pachet, Paris (FR)

(73) Assignee: Sony France S.A., Clichy la Garenne (FR)

( * ) Notice: Subject to any disclaimer, the term of this patent is extended or adjusted under 35 U.S.C. 154(b) by 706 days.

(21) Appl. No.: 11/576,641

(22) PCT Filed: Oct. 5, 2005

(86) PCT No.: PCT/EP2005/055003

§ 371 (c)(1),
(2), (4) Date: Jan. 4, 2008

(87) PCT Pub. No.: WO2006/037786

PCT Pub. Date: Apr. 13, 2006

(65) Prior Publication Data

US 2008/0126937 A1    May 29, 2008

(30) Foreign Application Priority Data

Oct. 5, 2004    (EP)    ................................. 04292364

(51) Int. Cl.
*G06F 3/14*    (2006.01)
(52) U.S. Cl. ....................... 715/726; 715/756
(58) Field of Classification Search ......... 715/719–723, 715/726, 731, 740, 744–747, 756–757, 755, 715/769, 802, 805, 808, 821, 823, 831, 862, 715/786; 725/52, 59, 60, 61
See application file for complete search history.

(56) References Cited

U.S. PATENT DOCUMENTS

| | | | |
|---|---|---|---|
| 5,594,469 A | | 1/1997 | Freeman et al. |
| 5,875,305 A | * | 2/1999 | Winter et al. ............... 709/231 |
| 6,088,018 A | | 7/2000 | DeLeeuw et al. |
| 6,104,864 A | * | 8/2000 | Kondo et al. ................ 386/117 |
| 6,160,899 A | | 12/2000 | Lee et al. |
| 6,608,628 B1 | * | 8/2003 | Ross et al. ................... 345/619 |
| 7,065,512 B1 | * | 6/2006 | Bertrand et al. ............... 706/45 |
| 7,185,283 B1 | * | 2/2007 | Takahashi .................... 715/723 |
| 7,315,985 B1 | * | 1/2008 | Gauvin et al. ............... 715/734 |
| 2002/0080280 A1 | * | 6/2002 | Champion et al. .......... 348/584 |
| 2002/0089530 A1 | * | 7/2002 | Markel ........................ 345/719 |
| 2002/0129366 A1 | * | 9/2002 | Schein et al. ................. 725/43 |
| 2003/0005445 A1 | * | 1/2003 | Schein et al. ................. 725/51 |

(Continued)

FOREIGN PATENT DOCUMENTS

WO    99 07153    2/1999

(Continued)

*Primary Examiner*—Steven P Sax
(74) *Attorney, Agent, or Firm*—Oblon, Spivak, McClelland, Maier & Neustadt, L.L.P.

(57) ABSTRACT

A content-management interface is implemented using superposition of graphical "widget" elements onto an on-screen display of the real-time image of a user. The widgets are motion-sensitive control elements which are responsive to user movement that produces motion of the user's displayed image at an on-screen location associated with that widget. The user can operate the widget virtually, for example by moving his hand over a widget, or pushing a widget along. Meta-data descriptive of the content to be managed is mapped onto widgets, enabling the user to interact with the meta-data, notably by changing it or by selecting content with reference to it.

19 Claims, 6 Drawing Sheets

U.S. PATENT DOCUMENTS

| | | | |
|---|---|---|---|
| 2003/0025599 A1* | 2/2003 | Monroe | 340/531 |
| 2003/0163361 A1* | 8/2003 | Burgess et al. | 705/10 |
| 2004/0056882 A1* | 3/2004 | Foreman et al. | 345/716 |
| 2004/0080615 A1* | 4/2004 | Klein et al. | 348/143 |
| 2004/0142746 A1* | 7/2004 | Hinami et al. | 463/32 |
| 2005/0071887 A1* | 3/2005 | Yoshida | 725/135 |

FOREIGN PATENT DOCUMENTS

WO        2004 073815        9/2004

* cited by examiner

CONTENT-MANAGEMENT INTERFACE

The present invention relates to the field of content management and, more particularly, to an interface allowing a user to manage content.

There are many situations in which a user has access to content, often content held in a media collection or library. The user will generally wish to be able to manage the content, notably: to select from amongst the items in the collection, either explicitly or by browsing (for example, with reference to some category), to add items to (or delete them from) the collection or to change the organization of the data within the collection, and to control the manner in which the content is experienced, e.g. control of volume of played-back audio, control of contrast in displayed images, etc.

For example, at a basic level, a jukebox provides a user with a collection of content (music) and the user can manage the content by pressing alphanumeric keys to select a song for playback and, possibly, can turn a dial to alter the volume of the played-back song.

To take a more up-to-date example, many users of personal computers have built up collections of content, such as music, video sequences, images, documents, URLs, etc., in digital form. Application software allows the user to select items to be accessed (displayed, played back, navigated to, etc.), and to control the manner in which the accessed item is experienced (altering volume, playback speed, resolution, etc.). Typically, the content will be arranged in a database that is organized using a data structure such as a set of directories and sub-directories.

In the present document, the expression "content" is used in a general manner to designate all forms of information including, but not limited to, text, Web pages, images, animation, video sequences, music, sounds, etc. Each item of content will generally have associated meta-data which describes the item of content in terms of some set of attributes and the values applicable to those attributes when describing this particular item of content. For example, a song file might be described by meta-data defining the song's title, artist and genre. This is described in more detail later in the present document.

In general, when a user manages content he is obliged to push buttons, turn dials, type on a keyboard, operate a pointing device (e.g. move and click a computer mouse), or otherwise operate some physical input device in order to control his access to and experience of the content. This distances the user from the content and renders the management of the content non-intuitive.

The preferred embodiments of the present invention provides users with a new paradigm enabling them to manage content in a more immediate and intuitive manner.

More particularly, the present invention integrates motion and/or gesture detection into content-management applications.

WO99/07153 discloses an interactive system which enables a user to display information, e.g. tourist information, based on the user's selections from a menu, those selections being made by means of user motion relative to the display. This system provides the user with a very limited amount of interaction with predefined information. Moreover although, in this system, the user can perform searches for particular kinds of information to be displayed, the user can only make searches that are already provided for in the system, that is, searches which correspond to pre-defined menu options. Thus, in this system, user selection of a particular "search" menu option always leads to performance of the same, explicitly-defined search.

The present invention provides a new kind of user interface to a content-management system, as defined in the accompanying claims.

The present invention further provides a content-management system comprising such a user interface.

The present invention still further provides a content-browser comprising such a user interface.

The present invention yet further provides a method of managing the interaction between a user and a content-management system, as defined in the accompanying claims.

The present invention still further provides a computer system as defined in the accompanying claims.

The present invention yet further provides a computer program as defined in the accompanying claims.

According to the preferred embodiments of the invention, an image capture device views a scene containing one or more users, and displays an image of the scene on a screen. On this image of the scene, the system superimposes graphical elements which correspond to motion- and/or gesture-sensitive widgets, that is, control elements which are responsive to movement and/or gestures related to a screen area with which they are associated. The user can move a part of his body (e.g. arm, hand, etc.) so that, on the screen, the image of his body part touches a displayed widget. The user can, thus, operate the widget "virtually", for example by moving his hand over a widget, pushing a widget along, etc.

According to the present invention, meta-data descriptive of content to be managed is mapped onto one or more widgets, notably motion-sensitive widgets, whose graphical elements are displayed on-screen. The user can move so that the on-screen image of his body (or, more usually, the on-screen image of a body part) moves over such widgets so as to operate them. In preferred embodiments of the invention, operation of such widgets enables the user to select or browse content with reference to the meta-data, change the meta-data, etc. This enables the user to manage the associated content in an engaging, intuitive and playful manner, making it simpler to perform content management functions and enhancing the pleasure of his experience.

According to the present invention, for one or more particular widgets in the user-interface there will be an association defined between that particular widget, a particular item of meta-data and a content-management function (or a class of content-management functions). However, this association is such that the content-management function that will be obtained when a user moves in relation to this particular widget will vary in a dynamic manner depending, notably, on the meta-data associated with that widget.

In particular, the function obtainable when a particular widget is operated will depend on the value that is "currently" applicable to an attribute defined by the particular item of meta-data associated with this widget, and "currently" will generally refer to the time when the widget is operated by the user. So, in the case of a widget associated with meta-data relating to the genre of a film, if a user operates the widget at a time when the value "Western" applies to film genre, then the content management function that results will depend on the value "Western" of film genre. If the user operates the same widget at a time when the value "Musical" applies to film genre, then he will obtain a somewhat different content-management function depending, this time, on the value "Musical" of film genre.

For example, consider a first widget that is associated with a first item of meta-data relating to a first attribute of items of content. The association between the first item of meta-data and the first widget might, for example, be defined such that operation of this first widget leads to a search being performed in an associated collection of items of content. The association in this example might further be defined to specify that the search should look for items of content which, when described in terms of the first attribute, take a value that is the same as (or different from) a dynamically-defined value, notably a value applicable at the time when the user operates the first widget.

It will be seen that the particular content-management function that is obtained when a given widget is operated is not totally predefined, instead it varies as a function of dynamically-varying meta-data attribute-values. Typically, the attribute value that will be considered to be "applicable" at a given time will be the attribute value applicable to an item of content which is currently considered to be "selected" in the system. For example, in the case of a user-interface for a music browser application, the attribute value "applicable" at a given time could, for example, be the value of the relevant attribute applicable to the music file currently being played, or last played, or currently selected for playing, etc.

However, the "currently-applicable" attribute-value could be defined in other ways: for example, the "currently-applicable" value of a first attribute could be the value applicable to that first attribute when describing the item of content which, currently, is the user's favourite, or currently is the most-played item of content, or is the item of content most recently added to the user's collection, etc. Thus, depending on which of these options is applicable in a given case, the "currently-applicable" value of the designated attribute will vary as the user changes his selection of items of content, or changes a ranking he assigns to different items of content, or adds items of content to his collection, etc.

According to the preferred embodiments of the present invention, given widgets need not be active at all times. However, when they are active, user motion in relation to an associated on-screen region will lead to performance of an associated content-management function which depends on a dynamically-variable attribute-value. The content-management function obtainable by operation of an active widget is implicitly defined, notably by the item of meta-data associated with the widget and by the attribute value applicable to that item of meta-data at the time of operation of the widget.

It will be seen that the user-interface of the present invention provides the user with an open-ended and extendible range of content-management functions. For example, if the user-interface is used to manage a collection of items of data and the user adds new items of content to the collection (e.g. by downloading from the internet), he may well add an item of content that has an attribute which takes a new value that had not been exhibited by any of the items of content that were already in the collection. If this attribute is associated with a widget, the user can obtain a new content-management function by operating the widget at a time when the new item of content is the one which sets the attribute-value "currently-applicable" to that same widget.

For example, in the case of a user-interface used to control content-management functions applied to a collection of scientific papers, the user may add to his collection a paper written by an author whose work had not previously figured in the collection. The user-interface may include a widget associated with "author", for example a widget arranged to fetch (e.g. from the internet) and add to the collection more scientific papers having the same "author" as the author of the paper last displayed on the display screen. The user can, thus, obtain a new content-management function "add to the collection more papers by Author X", simply by adding to his collection a previous work by author X.

Further particularities, features and advantages of the present invention will become apparent from the following description of preferred embodiments thereof, given by way of example, in which:

FIG. 1 is a diagram illustrating examples of different systems which can make use of a content-management interface according to the present invention, in which:

FIG. 4 is a series of diagrams illustrating, schematically, some examples of on-screen views produced according to a preferred embodiment of the invention, in which:

FIG. 5 is a series of photographs illustrating examples of on-screen views produced according to a preferred embodiment of the invention implemented in a music browser application, in which:

The present invention may be thought of as the application of techniques inspired by the field of virtual reality to the problem of how to achieve engaging, real-time management of content.

Virtual reality systems seek to provide the user with an engaging, immersive environment with which he can interact (often with the help of accessories such as a dataglove). "Projected reality" is one form of virtual reality system.

In "projected reality" systems, an image of the user is displayed on a screen which simultaneously displays an image of an environment with which the user can interact. In a projected reality system, the user need not use any accessories but can interact with the displayed, artificial environment simply by moving his body and watching how his image moves on the screen, relative to the displayed environment. The user is engaged by the projected, artificial reality and can interact with it in a playful and intuitive manner.

In the preferred embodiments of content-management interface according to the present invention, an image of the user is displayed on a screen which simultaneously displays certain graphical elements (widgets) with which the user can interact, virtually, so as to manage associated content in a desired manner. Meta-data describing the content is mapped onto graphical "widget" elements which the user can operate. The user interacts with the interface in real time and without the need of special accessories (such as datagloves), or peripherals (such as a keyboard) for inputting commands to the interface.

The content-management interface of the present invention can be embodied in a wide variety of different physical systems.

Figure 1A:
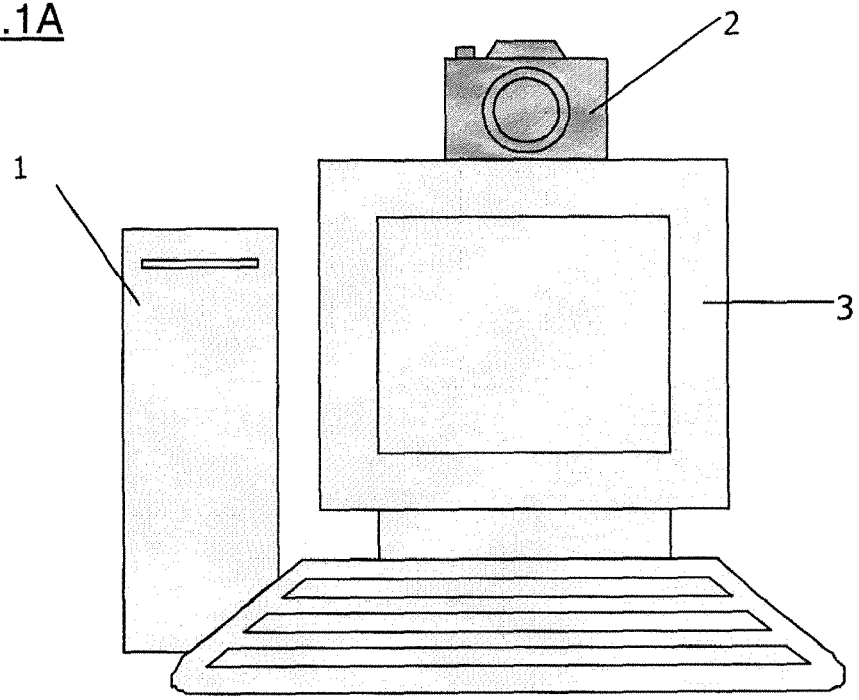
FIG. 1A illustrates a system using a computer monitor for display.

For example, as illustrated in FIG. 1A, one preferred embodiment of the present invention provides a content-management interface implemented using a personal computer 1 and associated peripheral elements including an imaging device 2 (e.g. webcam, Sony Eye Toy™, etc.) and a monitor screen 3. Content with which the user wishes to interact can be stored in the memory of the personal computer 1, or otherwise made accessible to the computer 1 (for example, via a network connection, by inserting media—CD-ROMs, DVDs, etc.—into an appropriate drive on the computer, etc.). The user moves around in front of the imaging device 2 and watches how his image, as displayed on the monitor screen 3, moves relative to graphical elements of the content-management interface which are also displayed on the monitor screen. He can manage content simply by moving his body so as to operate different ones of the widgets whose graphical elements are displayed.

Figure 1B:
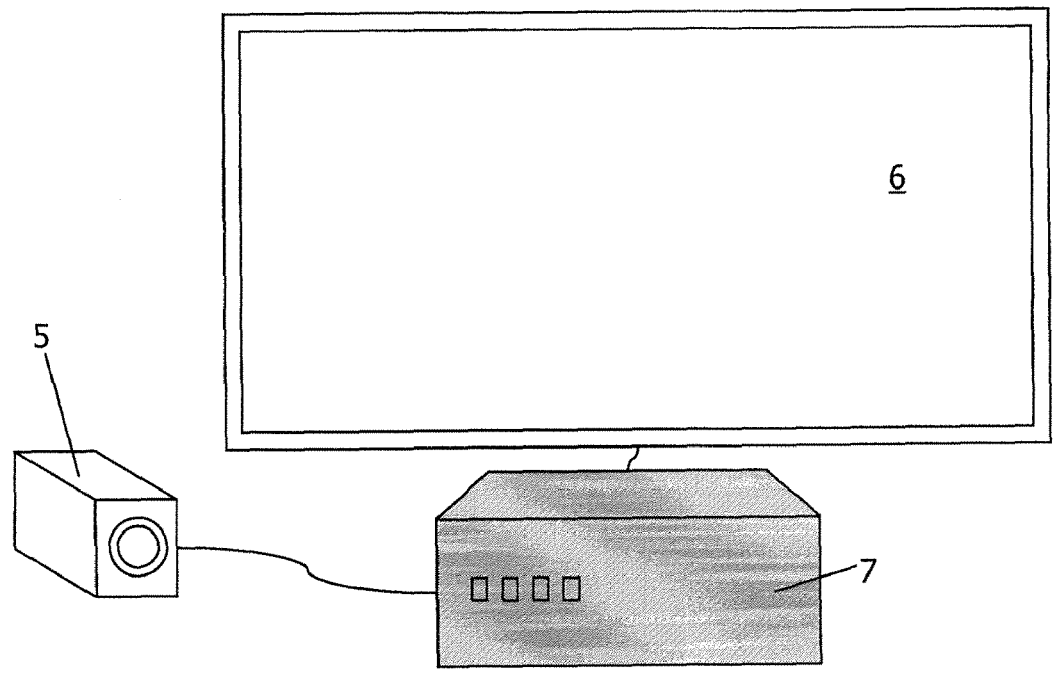
FIG. 1B illustrates a system using a rear-projection screen for display.

FIG. 1B illustrates a different example of a system in which the content-management interface of the present invention can be implemented. In this case, an image-capture device 5 feeds the user's image to a rear-projection screen 6 via a system controller 7.

As indicated above, in order to create a content-management interface according to the present invention it is necessary to make use of an imaging device and a display screen. However, nowadays, many potential users of such interfaces already own personal computers with monitor screens and webcams (as in FIG. 1A). They may also own content-management application software. Accordingly, certain embodiments of the present invention consist solely of software for generating and managing the content-management interface itself. Further embodiments of the invention consist of software which itself performs the content-management, as well as generating and managing the content-management interface. Yet further embodiments of the invention consist of hardware elements (e.g. related to imaging or display) as well as the above-mentioned software.

It should be mentioned that the present invention works in multi-user environments as well as in single-user environments. In a multi-user environment, all users visible to the system's imaging device have their images processed and displayed on the screen and can interact with elements of the interface. For the sake of simplicity, the following description discusses the case where a single user is present in the imaging device's field of view. The skilled person will readily understand how this teaching is extended to the case where there are several users.

The following functions are performed by the personal computer in the example of FIG. 1A and by the system controller 7 in the example of FIG. 1B:

Control of the display of the user image on the screen 3 (or 6),

Control of the overlay of other graphical elements of the interface (widgets, etc.) on the user image, Detection of the user's commands (as expressed by his virtual interaction with the displayed graphical elements of the interface), and Implementing the response to the user's commands (in terms of content management, e.g. playback of a video sequence selected by the user, navigation to a URL of a kind selected by the user, searching in a local or remote collection for content of a particular type, etc.).

The system in which the content-management interface of the invention is implemented may also perform additional functions including, but not limited to:

Adding items of content to a collection;

Deleting items of content from a collection;

Altering the data structure used to organize the collection; etc.

These additional functions may be performed via the interface according to the present invention, or by some other means (e.g. using conventional application software in association with an input device that the user must operate physically).

The techniques useable for:

capturing and analyzing the image of a scene containing a user, isolating the user from the background, detecting motion and/or gestures of the user by analysis of the processed image (and evaluating parameters of the motion/gesture, e.g. speed, duration and direction of motion, etc.), relating the image of the scene to the display area of a screen, identifying the areas on-screen that correspond to the user's motion/gesture and determining characteristics (e.g. speed, direction, etc.) of that motion/gesture, and merging the video data for generating the on-screen image of the scene with the video data representing the graphical elements of the interface, are well-known For example, the motion of a user's hand can be detected in the image using techniques such as optical flow detection, the mean shift algorithm and contour retrieving. Accordingly, it is unnecessary to describe these functions, and the means for achieving them, in detail here. Suffice it to say that these functions will typically be implemented in software, although hardware implementations and mixed hardware/software implementations can also be used.

Figure 2:
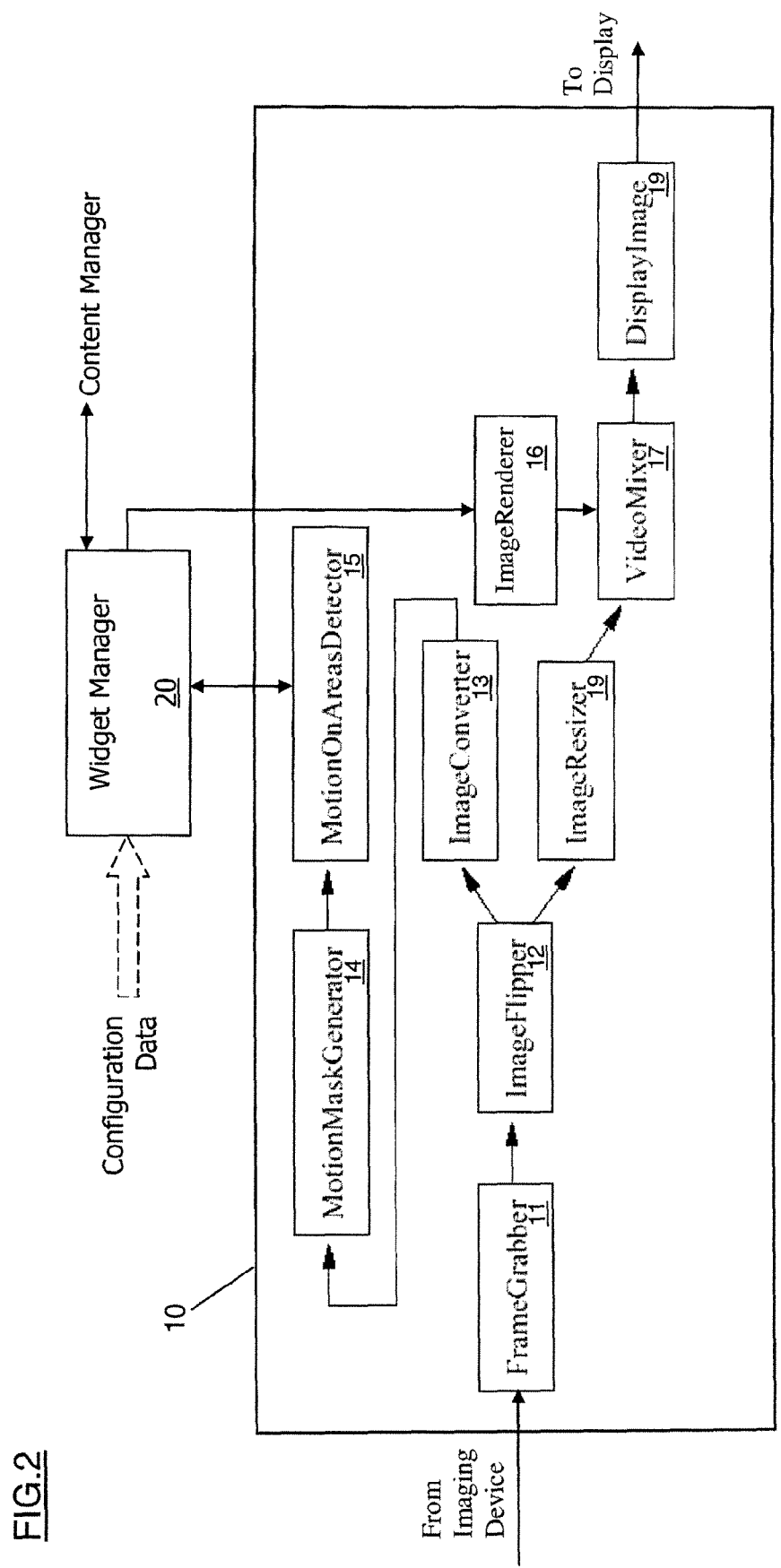
FIG. 2 is a block diagram illustrating various basic components used to produce a content-management interface according to a preferred embodiment of the invention.

FIG. 2 is a block diagram indicating a video core 10 of basic elements which are used to handle the image-processing and computing required to achieve the above functions in a preferred embodiment of the present invention.

FIG. 2 indicates that the video processing core 10 is connected to a module designated a widget manager 20 which in its turn interacts with a content manager (not shown). The content manager will typically consist of application software handling the physical accessing of content. The content manager may be integrated into the system (e.g. software) used to generate the content-management interface of the present invention or it may be external to it. In the following description it will be assumed that the content-manager consists of application software which is external to the system shown in FIG. 2 for creating and managing the content-management interface.

The widget manager 20 maintains an inventory of the widgets defined for the content-management interface and it can be considered that the widget manager 20 has a controller for each widget. The inventory includes all the information required to manage the functioning of each widget, including: information indicating which area of the screen is considered to be "the operable area" for this widget, what is the widget's current status (i.e. currently active or inactive), what graphical element (or elements) should be displayed on-screen to represent this widget (and where), for what operating mode(s) this widget is activated, etc.

The widget manager 20 can be implemented as three main modules:

a first module provided with functionality enabling it to interact with motion detecting elements of the video core 10;

a second module provided with the functionality required to generate video data representing graphical elements to be displayed on the display area of the screen for the different widgets; and a third module having the functionality required to interact with and manage content, as required by the particular application in which this interface is to be used.

Clearly it would be undesirable if communication between the widget manager 20 and the content manager resulted in blocking or stalling of the content-management interface (i.e. delays in reaction to a user's commands, i.e. motions). In order to avoid this problem, it is advantageous for the widget manager 20 to use separate threads (i.e. independent parallel computing processes) for different modules thereof.

The widget manager 20 can be used in a wide variety of interfaces embodying the present invention which differ widely with regard to the context of the content-management (e.g. browsing in a local collection of music files, searching the internet for scientific articles, etc.) and to the number and nature of widgets involved. Thus, the detailed implementation of the widget manager 20 may change considerably from one interface to another.

Also, the detailed implementation of the basic video-processing core 10 will vary depending upon the overall technical system in which the content-management interface is being implemented—e.g. depending upon the nature of the imaging device and display screen, depending upon the programming environment, etc For these reasons, it was considered to be advantageous to build a generic developer's kit enabling a common set of modules to be used to build different interfaces according to the present invention. This generic developer's kit contains:

a library of generic video blocks (for acquisition, processing and visualization of video),
  a library of generic widget user-interface blocks (for widget-related processing including generation of graphical-representation data for widgets), and
  a tool-kit enabling the video blocks and the widget user-interface blocks, respectively, to be parameterized and interconnected in different manners.

A generic developer's kit of this kind was built in the programming language C++ and it was found that the same basic libraries of blocks could be re-used in a different programming environment, e.g., Java, by adding an extra layer mediating between Java and C++.

Content-management interfaces according to the present invention can be built so as to be fully-configured, fully customizable, or so as to have some parameters already-configured and others capable of being customized by the user. If there are parameters of the interface that can be configured by the user (e.g. which meta-data can be mapped onto widgets, placement of widgets, which graphical elements can be used, etc.), then the interface may be provided with a configuration module to handle the presentation of options to the user and the preparation of configuration data based on the user's choices. This configuration data can be provided to the widget manager 20 so that it can develop an inventory of appropriate widgets.

In the embodiment of FIG. 2, the image signal, from whatever imaging device is capturing the scene containing the user, will be fed to the video-processing core 10 (e.g. to a frame grabber 11). The image is pre-processed as desired, for example using an image flipper 12 (which performs any desired horizontal or vertical reflection transformations on the input data), and an image converter 13 (which can change the colour space of the input image, e.g. changing 8-bit per channel RGBA to 32-bit greyscale). The pre-processed video data is supplied to a motion mask generator 14 which calculates the intensity difference between successive video frames. Typically, anti-noise filtering and thresholding will be applied to the frame difference data. The filtered frame differences are then supplied to a motion-on-areas detector 15.

For each widget it is known what block of pixels on-screen is the "operable area" for this widget. Moreover, the relationship between different portions of the video signal received by the motion-on-areas detector 15 and different on-screen locations is known. Accordingly, the motion-on-areas detector can be configured to monitor only those areas in the video signal that correspond to widget operable areas. For each widget, the motion-on-areas detector 15 applies a suitable algorithm to determine whether or not there has been user motion in the widget's operable area and, if required, determines the characteristics of that motion (see below).

Now, the operable areas to be monitored by the motion-on-areas detector 15 can change, for example, because a widget is considered to have moved, or a widget has become activated or deactivated. Accordingly, the motion-on-areas detector 15 must be updated as to which operable areas should be monitored at any given time. Preferably this updating is performed by the widget manager 20. Furthermore, this caters for creation/deletion of widgets when the interface is customized/set-up (either at manufacture, or by the user in an embodiment where this is permitted).

It has been found that the interface operates satisfactorily in the case where, in order to determine whether or not motion is occurring in a given area, the motion-on-areas detector 15 processes a temporal sequence of Boolean matrices of filtered frame differences. This represents a compromise which simplifies calculations yet leads to acceptable performance of the interface.

In preferred embodiments of the invention, the motion-on-areas detector 15 considers video frames spanning a particular time interval—which is typically between half a second and a second (this can be expressed as e.g. "has the motion lasted for the last n frames", n being an integer which may be defined differently for different widgets)—in order to decide whether or not motion is occurring. This helps differentiate between true and purposeful user motion, which it is appropriate to interpret as a control to the interface, and random movements (noise).

Moreover, for particular widgets, it may not be sufficient to determine simply that motion has occurred in a given on-screen area, other parameters of the motion may be significant, e.g. for a scrollable-list widget, it may be important to know direction and speed of motion. The motion-on-areas detector 15 is designed to implement any such processing as may be required.

Figure 3:
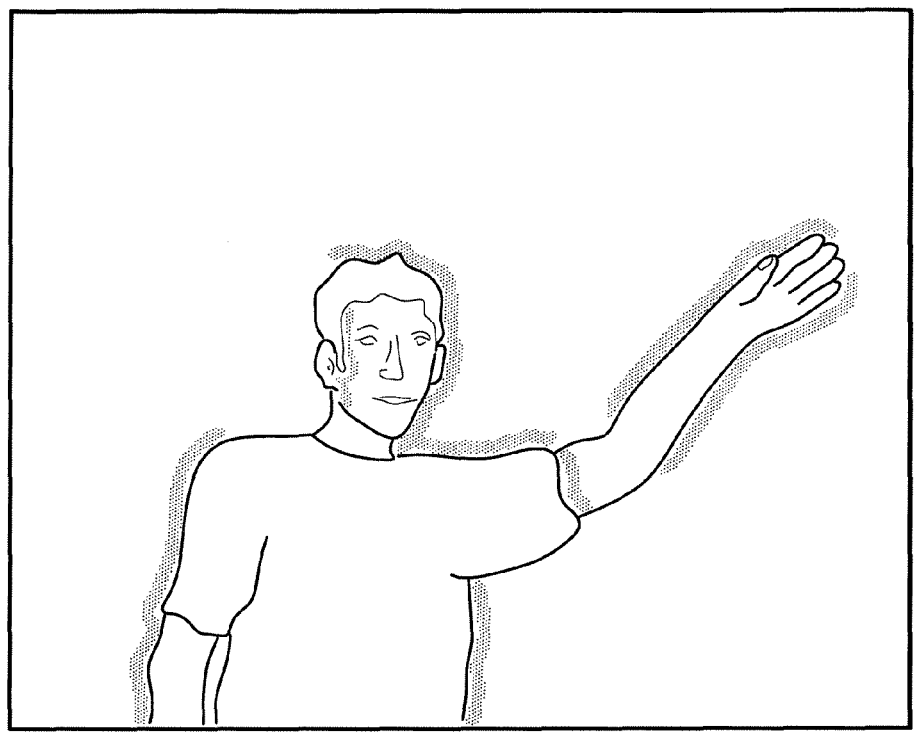
FIG. 3 is a diagram illustrating one example of components in a widget manager used in the content-management interface of FIG. 2.

FIG. 3 is an image of a user, processed (as described above) to highlight those areas of the user which are moving. The highlighted areas can be considered to be control surfaces with which the user can activate different parts of the interface.

If the motion-on-areas detector 15 determines that there has been motion in the operable area of a given widget it generates a signal termed an "event". The widget manager 20 is equipped with "listeners" which monitor the occurrence of such events and, when "events" occur, trigger action by an appropriate widget controller (which may be a single controller for all widgets or a set of controllers dedicated to particular widgets), Where relevant, the motion-on-areas detector 15 includes in the "event" signal information regarding the characteristics of the motion.

The widget controllers of the widget manager 20 respond to user motion information by causing functions assigned to their respective widgets to be performed. This will generally involve interacting with the widget manager's module which generates image data (so as to generate, move or change image data applicable to the widget's graphical representation) and with the module which handles communication with the content-manager (to cause the user's desired management of content to be realized).

Based on his common general knowledge, the skilled person will readily understand how to design the widget manager 20 so as to be able to perform the functions described above. Accordingly, it is unnecessary to give a detailed explanation on this topic here.

Image data generated by the various widgets is forwarded to an image renderer 16 (which may also be supplied with image data for other graphical elements to be superimposed on the user's image). The image renderer 16 supplies corresponding video data to a video mixer 17 and on to a display, via an image-display interface 18. The video mixer 17 also receives image data corresponding to the user's image (or, more precisely, the scene imaged by the imaging device). Typically, this video data will have been processed in an image resizer 19 so that the dimensions of the video data fit the dimensions of the display screen.

As indicated above, the content-management interface of the invention makes use of "widgets", that is, control elements associated with particular regions of the display screen. For certain widgets, this association may be a dynamic one. According to the preferred embodiments of the invention, a user's motion which, when displayed on-screen, is "in" the display-screen area associated with a widget is interpreted as operation of the widget. The on-screen area where motion of the on-screen image of the user is considered to operate the widget can be termed the widget's "operable area".

The present invention makes use of widgets which have an association with meta-data descriptive of the content to be managed. Meta-data comes in various forms, dependent upon the nature of the content being considered. Table 1 below gives some examples of different types of meta-data that, typically, are associated with different types of content. It should be mentioned that the list of different types of content, and the examples of different kinds of meta-data, in Table 1 are not exhaustive.

TABLE 1

| Nature of Content | Meta-data on "Extrinsic" features | Meta-data on "Intrinsic" features |
|---|---|---|
| Song | Artist | Genre |
| | Nationality of Artist | Tempo |
| | Title | Energy |
| | Date of Recording | |
| | Owner of intellectual property rights | Percussivity |
| Movie | Director | Genre |
| | Title | Setting (e.g. primarily urban, coastal, rural, etc.) |
| | Year of publication | |
| | Principal Actors | |
| | Owner of intellectual property rights | |
| Image | Author | Colour histogram |
| | Year of Publication | Class (e.g. synthetic image, photograph, etc.) |
| | Owner of intellectual property rights | |
| Web page | URL | Nature of web page (e.g. dynamic, etc.) |
| | Owner of intellectual property rights | Metatags |
| Text document | Author | Keywords |
| | Year of Publication | |
| | Owner of intellectual property rights | |

Table 1 lists meta-data in two categories: meta-data on "extrinsic features", and meta-data on "intrinsic" features. It will be noted that, in general, the meta-data listed for "extrinsic" features refers to characteristics relating to the circumstances in which the content was created. By way of contrast, the meta-data listed as relating to "intrinsic" features relates to the characteristics of the content itself. In many cases, the meta-data relating to intrinsic features of the content can be determined automatically by suitable analysis of the content (i.e. without a priori knowledge). On the other hand, the meta-data relating to "extrinsic" or "circumstantial" features cannot be determined without a priori knowledge.

The above categorisation of meta-data, by reference to whether it relates to "extrinsic" or "intrinsic" features of the associated content, is based on an empirical consideration of the nature of the meta-data and does not reflect a standard approach in this domain.

In a given application, the meta-data describing content will be organized according to some schema defining the attributes that will be described (and assigning names to these attributes). A given item of content will then, ideally, have meta-data which assigns a value to each of the attributes defined according to the schema.

For example, a collection of paintings might use a schema according to which there is defined a first type of meta-data, "Artist", which gives the painter's name, a second type of meta-data, "Title", which lists the standard name of the painting, and a third type of meta-data "Medium", which indicates whether the painting is in oils, watercolour, or pastels. In such a case, a particular painting, say Leonardo da Vinci's "Mona Lisa", could have associated meta-data:

<Artist(Da Vinci, Leonardo")><Title(Mona Lisa)><Medium(Oils)>

In the preferred embodiments of content-management interface according to the present invention, widgets are used which have an association with particular types of meta-data. This association can be specified at the time of manufacture, or during a configuration phase (whether by the manufacturer, the user, or the system itself). Accordingly, once the interface has been configured it expects to find certain types of meta-data associated with each item of content it is going to manage.

When a user acquires content he often acquires associated meta-data at the same time, even if he is not aware of this. For example, when a computer user uses music-sharing application software to download a song from a file-sharing network, the song is loaded into a database held in the local computer memory and meta-data identifying the performer, song-title, album, etc. will often be loaded into the database at the same time (whether or not it is displayed to the user). Generally, it is a simple matter for interfaces according to the present invention to work with meta-data that is held in the same database (or an associated database) as the content being managed.

However, there may be circumstances where a user wishes to access content which has no meta-data associated with it or, at least, lacks some type of meta-data which the interface according to the invention is expecting to find. In such circumstances different solutions are possible. It may be that the interface widget that is mapped to the missing kind of meta-data is represented on screen using a graphical element which represents an icon indicating the value of this type of meta-data for a selected item of content (e.g. for a selected song, the national flag of a singer's country). In such a case, an alternative icon could be displayed indicating that the value of this type of meta-data is unknown.

Alternatively, it may be the case that the missing type of meta-data can be obtained, for example, by consulting a catalogue or database with reference to the data which the interface does have for this item of content. For example, the interface could seek meta-data describing a movie by sending the movie's title and year of publication to the Internet Movie Database (http://www.imdb.com), or it could seek meta-data describing a song by sending the MusicBrainz ID of the song to the MusicBrainz database (http://www.imusicbrainz.org), etc.

If the missing meta-data is meta-data describing "intrinsic" features of the content, then yet another possibility exists; the interface may include a module enabling a value for the missing type of meta-data to be extracted automatically by analysis of the content. For example, if the content-management interface is implemented in a context where it is going to be configured for document-management, then it might be provided with a module for extracting keywords from documents by statistical analysis of the text; in a context where it is going to be configured for music-browsing, it might include modules for automatically evaluating percussivity, energy, etc.

The nature of the result that is obtained by operating a widget in a content-management interface according to the present invention varies dependent upon the widget's type. The preferred embodiments of the invention make use of widgets of a number of different types, amongst others:

scrollable-list widgets: on-screen these are represented as a screen area in which a list is displayed, the list can scroll in different directions, or stop, dependent upon the user's motions and the user can select from the list by motion in an appropriate on-screen location within the scrolling-list-widget screen area—the list will often be a list of values that can be taken by an attribute corresponding to a particular kind of meta-data, these values can be expressed using any convenient representation, including icons;

mapped-meta-data widgets: these widgets typically map icons representing different types of meta-data onto respective designated areas of the display screen—by virtually "touching" the displayed icon, the user can manage content with reference to the corresponding meta-data (e.g. search for more content having the same value, or a different value, of this meta-data, etc.). Moreover, a mapped-meta-data widget can be designed such that when the user operates this widget he can set the meta-data of an item of content (in general, the "currently-selected" item of content) to a value that he desires—this may involve use of the mapped-meta-data widget in association with a further widget (for example a scrollable-list widget which can display the different choices of values to which the meta-data can be set).

mode-selector widgets: these widgets enable the user to change the interface's display mode/operating mode, for example, so that at certain locations on the screen it changes over from displaying a first set of widgets and displays instead a second set of widgets;

selectively-activatable widgets: these widgets can be activated or deactivated as required, for example, they can be deactivated because the user has selected an interface display mode in which the corresponding control is not required (and the corresponding graphical element is not being displayed)—when a widget is deactivated, the widget ignores on-screen motion in its associated operable area;

toggling widgets: these widgets are associated with a pair of functions and user action causes toggling between the two functions;

placeholder widgets: these widgets serve as placeholders for others, so that the other widget (which may occupy a large on-screen area) need not be displayed continuously, displaceable widgets, including "slider widgets": the location on the screen of the whole or part of the graphical element representing these widgets can change dependent upon user action—"slider widgets" provide the user with a metaphor for a physical slider (see below)—the widget's operable area may be assigned to different areas on the screen at different times, corresponding to the movement of the graphical element associated with the widget, and playback-control widgets: these widgets control the playback of certain content to the user and, for example, may be represented using graphical elements corresponding to the controls on a conventional media player device (e.g. play, pause, fast-forward, skip to next track/scene, etc.).

It is to be understood that a single widget may be of two or more of the above types, for example, a widget may be both a mapped-meta-data widget and a selectively-activatable widget, both a mapped-meta-data widget and a slider widget, both a mapped-meta-data widget and a scrolling-list widget, etc.

In general, for each widget a graphical element will be displayed on the screen so as to occupy the widget's operable area—this gives the user the visual reference allowing him to know "where" he must move his on-screen image in order to operate this widget. However, a precise one-to-one relationship between the block of pixels occupied by the graphical element displayed for a widget and that widget's operable area is not mandatory (the displayed graphical element may be slightly smaller or larger than the widget's operable area, and/or offset slightly therefrom) provided that the location of the graphical element is appropriate to prompt the user such that his motion relative to the graphical element will entail motion in the widget's operable area.

It is preferred to leave a space between the operable areas of different widgets because overlap between them can increase ambiguity in interpreting a given motion of the user (the system has difficulty in determining which of the widgets in the area of proximity/overlap the user intended to activate).

However, it has been found that there are cases where the system can correctly assign motion to the appropriate widget even when two widgets have contiguous operable areas. This has made it possible to design an interface having display screens in which paired widgets are used, one being a "primary widget" and its pair being a "label widget". The "label widget" is represented on screen using a graphical representation which is a label indicative of some property associated with the primary widget. The primary widget may be represented on screen using an icon. The operable areas of the paired widgets are closely located on the display screen (and so are their graphical representations). The user can move so that there is motion of his image with regard to the operable areas of either one of the paired widgets and obtain performance of a function associated with this pair of widgets.

If there are too many widgets which require operable areas on the display, then the size of each operable area will, necessarily, be small and it may be difficult to determine accurately whether the user is or is not operating a given widget. Thus, it is preferred to optimize use of screen space by, for example, using different operating modes such that different sets of widgets required to achieve particular functions are only displayed on the screen when they are needed.

Widgets can be represented graphically in any convenient way. Often, a widget will be represented by a graphical element depicting a bounded area, so as to look like a button. Clearly, the shape of the bounded area can be set, as desired and, specifically, need not adopt the form represented in the drawings of the present application. In preferred embodiments of the invention, the graphical representation of a widget changes when that widget is operated, for example it may flash or change colour (temporarily or until "switched off", for example by operation of some other widget). This enables the user to realize when the interface has registered one of his actions as a command.

Other graphical representations of widgets can be employed, especially graphical representations that are metaphors for physical control elements with which the user is familiar from everyday objects. In this regard, it should be noted that the preferred embodiments of the present invention make use of a graphical element which is a metaphor for a slider.

The "slider" graphical element occupies an elongated region on the display screen and, in general, depicts an outer boundary and a filler contained within that boundary. The filler extends from one end of the elongate boundary towards the other and occupies a variable portion thereof dependent upon how the user has set the parameter associated with this widget. Slider widgets are well-adapted to enable the user to control a continuously-variable parameter, for example, audio volume, image illumination, etc. When determining how to interpret a user's command applied to a slider widget, two approaches are possible:

a) Consider where, relative to the span of the slider's graphical element, the user's on-screen image has moved (e.g. at the "high" end, a third of the way along, etc.) and set the associated parameter to a value corresponding to that position within the parameter's range, implementing a step change in that parameter, if need be; or b) Consider whether or not the user has moved in the locality of the top of the "filler" and, if he has, try to determine in which direction he is trying to "move the slider"—then vary the associated parameter in a continuous manner until the user's displacement of the slider stops.

These two different approaches may entail different definitions of what is the operable area for the slider widget (i.e. the whole of the on-screen area corresponding to the graphical representation of the slider, or just an area around the end of the "filler").

The different types of widgets, and their use in content-management interfaces according to preferred embodiments of the invention, will now be described, with reference to FIGS. 4 to 6.

Figure 4A:
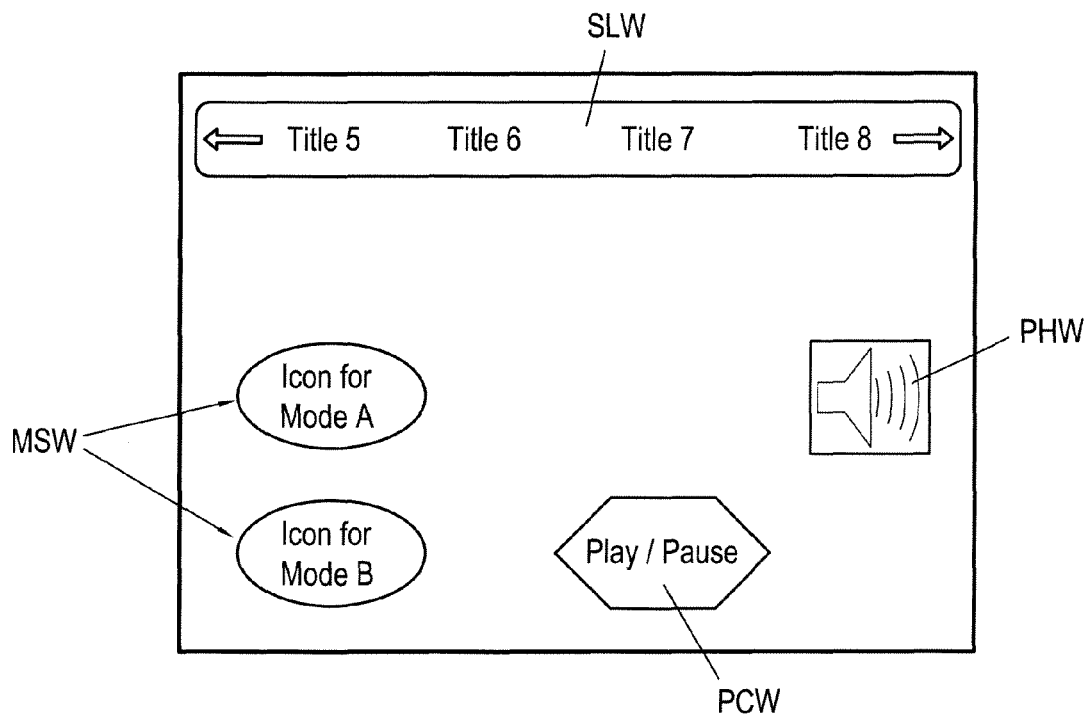
FIG. 4A illustrates the use of a scrolling-list widget.
Figure 4B:
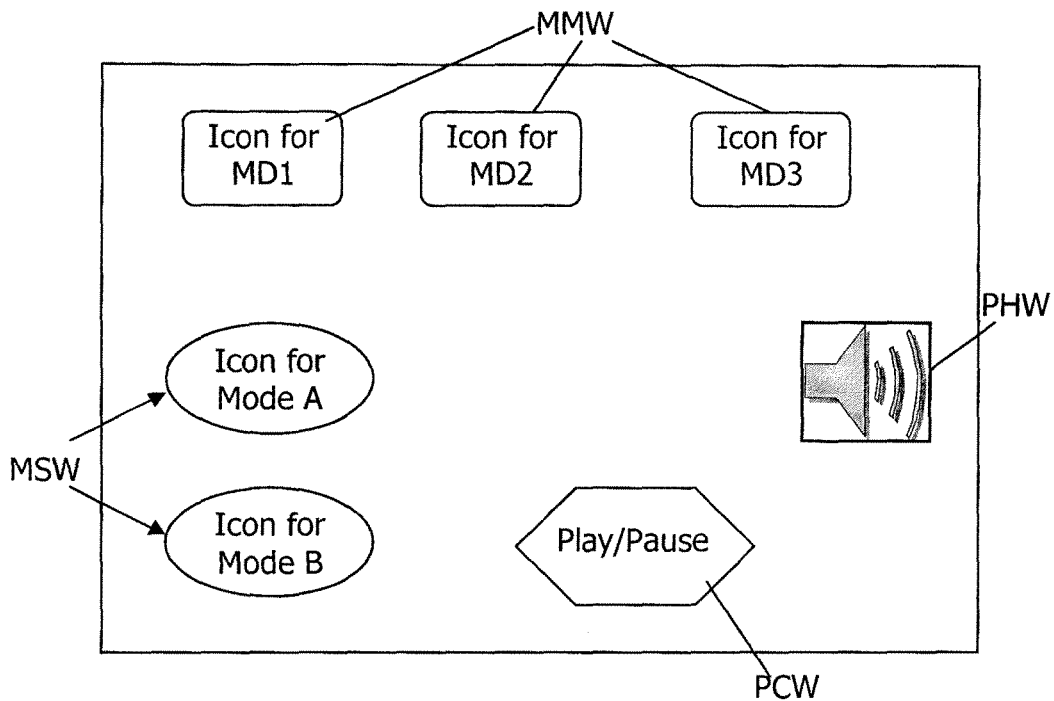
FIG. 4B illustrates the use of mapped-meta-data widgets for browsing content.
Figure 4C:
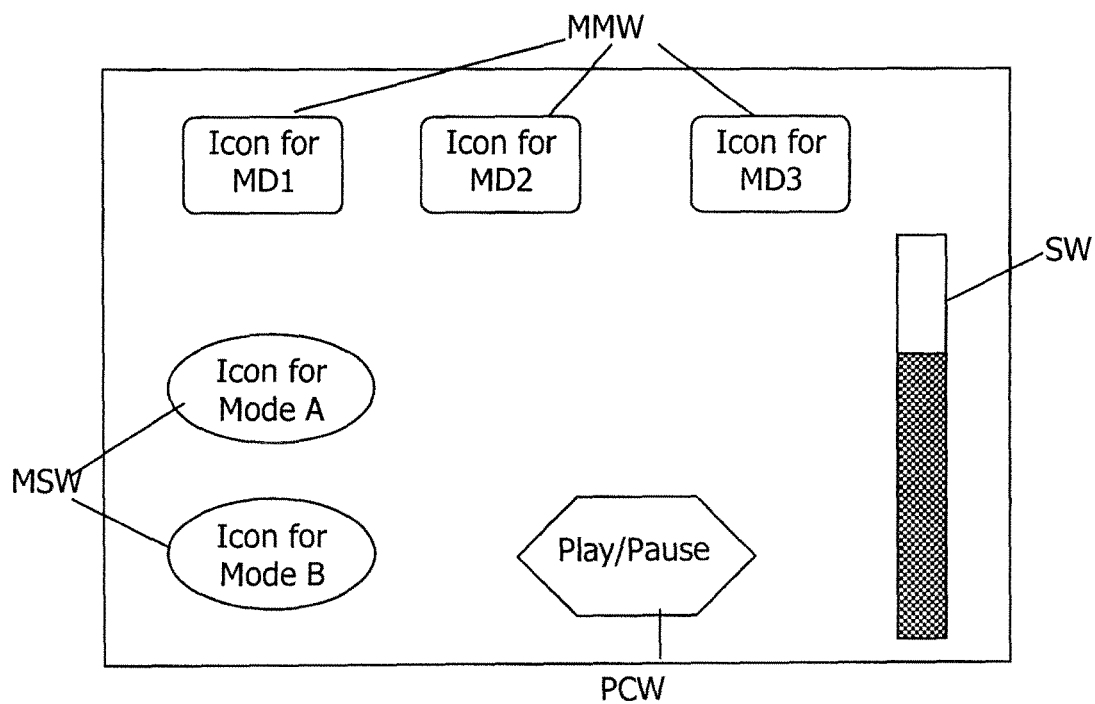
FIG. 4C illustrates a slider widget.

FIGS. 4A to 4C are diagrams illustrating examples of the placement of a number of widget graphical elements on a display screen in a content-management interface according to one preferred embodiment of the present invention. To simplify the explanation, FIGS. 4A to 4C do not show the image of the user on which these graphical elements would be superimposed in practice.

Figure 5A:
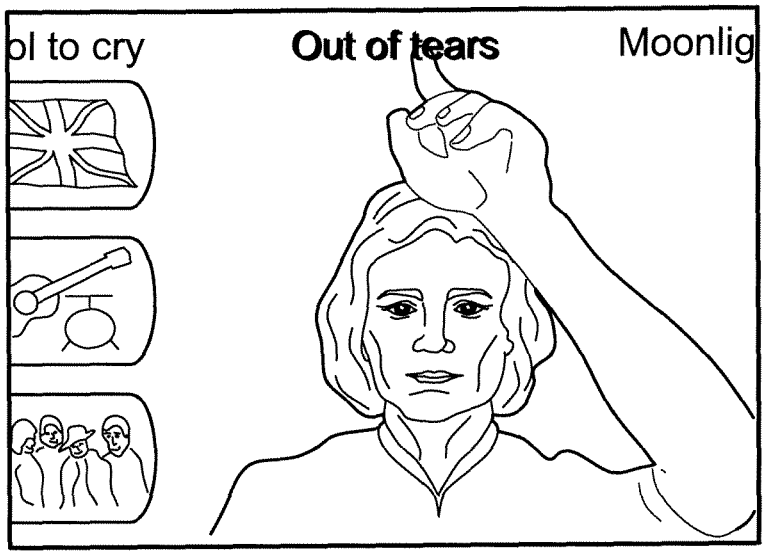
FIG. 5A illustrates use of a scrolling-list widget.
Figure 5B:
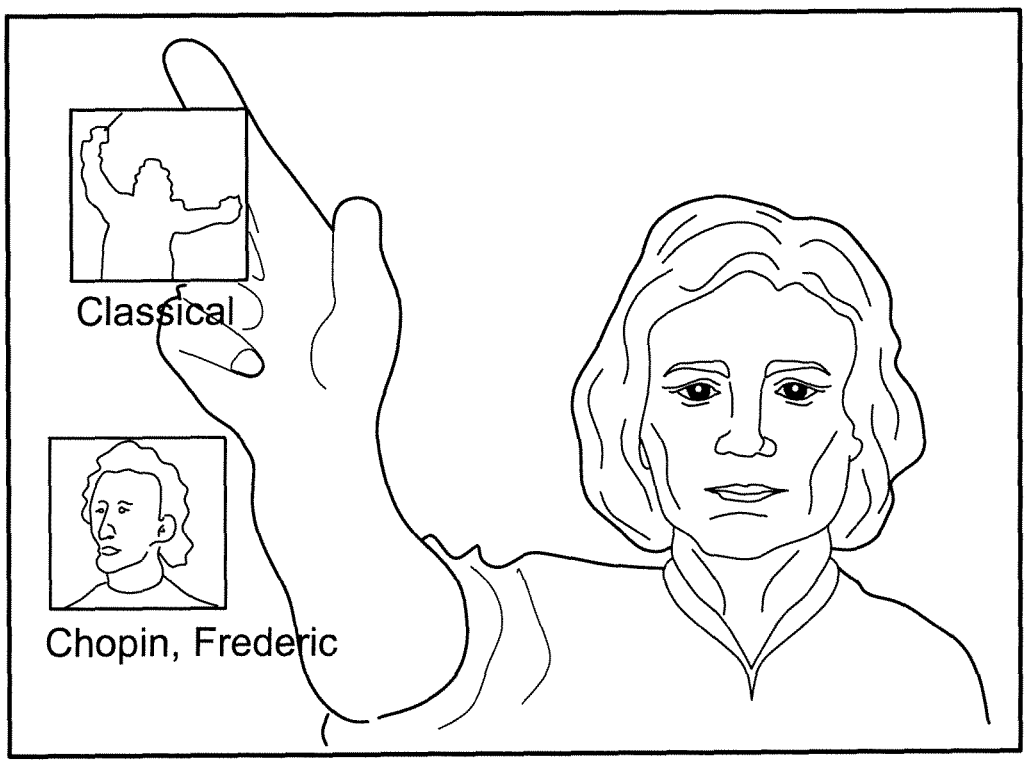
FIG. 5B illustrates use of mapped-meta-data widgets for browsing content.
Figure 5C:
FIG. 5C illustrates a slider widget.
Figure 6:
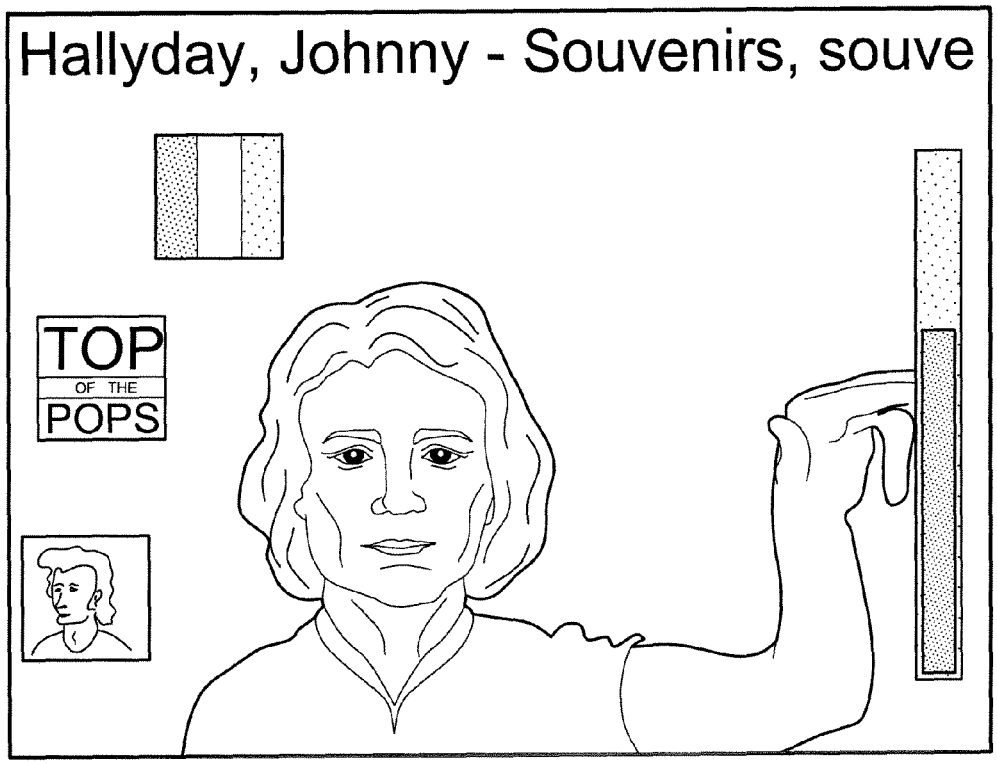
FIG. 6 illustrates a different on-screen presentation of widgets in the music browser application of FIG. 5.

FIGS. 5A to 5C relate to an example of a content-management interface according to the invention for a music browser application and show screen displays involving examples of certain widgets shown in FIGS. 4A to 4C.

As shown in FIG. 4A, in one display mode, the content-management interface according to the present preferred embodiment of the invention displays a scrollable-list widget, SLW, two mode-selection widgets, MSW, a playback-control widget, PCW and a placeholder widget, PHW (in this case a placeholder for a volume slider widget to be discussed later on).

The scrollable-list widget, SLW, controls display of a list and selection of items from within the list. According to the preferred embodiments of the invention, the items in the list consist of the different values that can be assigned to an attribute defined by some type of meta-data related to the content. FIG. 4A illustrates the example where the scrollable-list widget, SLW, displays a list of titles scrolling across the top of the display screen. Clearly, the particular location at which the scrolling list is displayed on the screen is not critical; it could be across the bottom of the screen, from top-to-bottom (or vice versa) at one side of the screen, from one extremity to the other of a window drawn on the screen, etc. Moreover, as indicated above, the items in the scrollable list need not be words, they could be some symbolic representation of the items in the list (e.g. icons).

When the user moves so that the image of a body part (e.g. his arm or his hand or a finger) moves in the screen area displaying the scrollable list controlled by a scrollable-list widget the result is, as follows:

if the user moves so that the image of his hand/finger moves in the region at the right-hand end of the screen area displaying the scrollable list, the list will scroll towards the left (i.e. to bring back onto the screen items which have just exited on the right-hand side of the screen);

if the user moves so that the image of his hand/finger moves in the region at the left-hand end of the screen area displaying the scrollable list, the list will scroll towards the right (i.e. to bring back onto the screen items which have just exited on the left-hand side of the screen); and if the user moves so that the image of his hand/finger moves in the region at the centre of the screen area displaying the scrollable list,—the item listed at the centre of the screen is selected for some purpose (an associated file in memory keeps track of which item of the list is located in this centre screen area at a given time).

In preferred embodiments of the invention, the controller of a scrollable-list widget is designed such that the speed of list-scrolling is related to the detected speed of movement of the image of the user's hand/finger in the regions at the right and left ends of the screen area displaying the scrollable list.

Moreover, in preferred embodiments of the invention, the controller of a scrollable-list widget is designed such that scrolling of the list only occurs while there is continued motion at the right end or left end of the screen area displaying the list; if the motion stops, then the list stops scrolling. However, the controller of the scrollable-list widget could be designed to keep the list scrolling even after the user stops moving. Some other action could be used as the trigger for stopping scrolling of the list, such as the user virtually tapping a particular portion of the screen area that displays the list.

FIG. 5A is a photograph of a screen display obtained during use of a music-browsing interface according to one embodiment of the invention. The photograph shows a scrollable list widget at the top of the screen, displaying a list of titles of different songs by the Rolling Stones. The user has stopped scrolling of the list by moving his arm such that the image of his finger is moving at the centre of the displayed list. Continued virtual "tapping" of this on-screen region has lead to selection of the song whose title is displayed at the centre of the scrollable list area, that is "Out of Tears". The selected song title has been greyed relative to other listed titles so as to show the user that his selection of this song title has been registered by the system. In this embodiment of the invention, selection of this title leads to automatic playback of the song "Out of Tears". However, selection of an item listed in the scrolling list could lead to some other action with regard to content associated with that item. For example, if the scrolling list is a list of different genres of movie, selection of a particular genre in the list could lead to display of a randomly-chosen movie of the selected genre, or to display of a list of available movies in the selected genre, etc Incidentally, although it is indicated above that the user selects an item from a scrolling (or scrollable) list by stopping the scrolling action and selecting the item at the centre of the screen, the selection could be made in other ways. For example, this widget could be defined such that "action" anywhere in the displayed list leads to selection of the listed item appearing at that location. Moreover, it is not essential to halt scrolling of the list before a selection is made (although it is convenient to halt scrolling once the system has noted the user's selection, because this provides the user with another visual cue indicating that his command has been registered by the system).

Returning to FIG. 4A, it shall now be considered what happens when the user moves so that the image of his hand/finger moves over the graphical element representing the playback-control widget, PCW. FIG. 4A illustrates the case where the graphical element representing the playback control widget is a metaphor for a button on a conventional media player. More particularly, in the example illustrated in FIG. 4A, operation of the playback-control widget toggles between "playback" and "pause" functions. In other words, if a song or movie is being played back to the user, he can "pause" that song/movie by moving so that the image of his hand "presses" the on-screen representation of the play/pause playback control widget.

In the example of FIG. 4A, two separate widgets could have been used, one for the play function and a separate one for the pause function, but it is advantageous to combine the two functions into a toggling widget so as to reduce the number of different widgets that are required to have distinct operable areas on the display. Preferably, the graphical element displayed with regard to a toggling widget changes to reflect the state of that widget. For example, if some content is currently being played back, it is helpful to represent a toggling play/pause widget using a graphical element/icon that represents a "pause" function—this enables the user to see what function he would obtain next if he operated that widget.

The number and nature of the playback-control widgets used in a content-management interface according to the present invention depend upon the particular application. For example, when songs, movies and the like are being managed, it may be appropriate to use one or more playback-control widgets each being metaphor for some button on a conventional media player (e.g. stop, fast-forward, skip to next chapter, etc.). As another example, when documents are being managed it may be appropriate to use one or more playback-control widgets associated with functions such as "page down", "next page", "last page", etc.

The placeholder widget, PHW, shown in FIG. 4A is a placeholder enabling a user to invoke a function related to another widget which is not currently being displayed. Preferably, as illustrated in FIG. 4A, an icon is provided on the graphical representation of the placeholder widget so as to indicate the nature of the function that can be invoked by operation of this placeholder. When the user moves so that the image of his hand/finger moves over the graphical representation of the placeholder widget, the controller of this placeholder widget deactivates the placeholder widget and activates instead the widget associated with the invoked function.

In FIG. 4A the placeholder widget is marked with an icon representing a loudspeaker and it is a placeholder for a slider widget representing audio volume. FIG. 4C represents the case where the placeholder widget PHW has been operated by the user, resulting in the removal from the screen of the graphical element representing the placeholder widget and the display of a graphical element representing a slider widget, SW.

In preferred embodiments of the invention, when a placeholder widget is associated with a further widget, the widget controller controlling that further widget is designed to monitor the duration of the user's on-screen motion in the operable area associated with that further widget. This enables the widget controller to deactivate the further widget, and reactivate the placeholder widget, a predetermined time after the user's motion has ceased. In this way, the further widget is only active (and its graphical representation is only displayed) for the time period when the user is really interested in controlling the function associated with that further widget.

Preferred embodiments of the invention use placeholder widgets in association with slider widgets. It has been found that slider widgets, especially those whose operable area is near the edge of the display screen, are liable to be operated spuriously when users enter and leave the field of view of the imaging device. By using placeholder widgets, this spurious operation of sliders can be prevented (or, at least, drastically reduced) because the slider widget is only active for relatively short periods of time.

The mode-selection widgets, MSW, shown in FIG. 4A enable the user to select between different operating modes of the interface, in this case, Mode A and Mode B. A different display mode is associated with each of the interface-operating modes. FIG. 4A relates to the case where mode A has been selected, which causes the scrollable-list widget, SLW, to be displayed at the top of the screen. In FIGS. 4B and 4C, the user has selected Mode B and, in place of the scrollable list widget, SLW, three mapped-meta-data widgets, MMW, are displayed at the top of the screen.

In order to operate the mode selection widgets shown in FIG. 4A, the user moves such that the on-screen image if his hand/finger moves over the graphical element representing the chosen operating mode of the interface. For example, interface operating mode A might correspond to an operating mode in which the user can selects songs by selecting from a scrolling list of titles by a particular performer, and interface operating mode B might correspond to an operating mode in which the user browses songs by category (different categories being represented using different mapped-meta-data widgets).

In preferred embodiments of the invention, icons are displayed on the graphical elements representing mode-selection widgets. This enables the user to understand what he is selecting when he selects the different operating modes associated with those widgets. Note that FIG. 4A shows separate widgets (and graphical elements) enabling the user to choose between different operating modes of the interface. Alternatively, a toggling widget controlling mode selection could have been used. Obviously, if there are more than two operating modes an increased number of mode-selector widgets can be defined, or a toggling widget having more than two states can be used. FIGS. 4B and 4C illustrate three mapped-meta-data widgets, MMW, displayed at the top of the screen. Each of these mapped-meta-data widgets is associated with a respective type of meta-data and, preferably, displays an icon indicative of what that type of meta-data is. For example a first meta-data-mapped widget could be mapped to a first kind of meta-data, MD1, related to the country of a song's performer, a second meta-data-mapped widget could be mapped to a second kind of meta-data, MD2, related to a song's genre, and a third meta-data-mapped widget could be mapped to a third kind of meta-data, MD3, related to the song's performer.

When a user moves such that the on-screen location of his hand/finger moves in the operable area of a meta-data-mapped widget he operates that widget. The result of operation of the widget depends upon the configuration of the widget's controller.

More particularly, the widget's controller will define an association between a particular meta-data attribute and content-management functions. When the user's motion indicates that this widget is operated, the widget controller will trigger performance of a content-management function dependent on the value that is "currently" applicable to the specified meta-data attribute. The widget controller can defer its determination as to what is the currently-applicable value of the specified attribute until the moment when the widget is operated, or it can continuously (or periodically) monitor how the specified attribute changes as the user-interface is operated.

In preferred embodiments of the invention directed to content-browsing applications, when an item of content is selected for accessing (playback, display, etc.) the mapped-meta-data widgets are mapped to the values of the meta-data applicable to the selected item - for example, a mapped-meta-data widget associated with the kind of meta-data <Tempo>, is mapped to meta-data <Tempo(Fast)>if the currently-selected song has a fast tempo. The user can then search, browse content, and make selections with reference to the meta-data of the currently-selected item.

In this context, the controller of a meta-data-mapped widget associated with a first kind of meta-data - e.g. <Tempo (Fast)>, based on the meta-data of the currently-selected song—can be designed such that, when this widget is operated, the widget controller commands the selection of more content having the same value of this meta-data, i.e. more songs having the meta-data <Tempo(Fast)>. Alternatively, the widget controller could be designed such that operation of the widget mapped to <Tempo(Fast)>is interpreted as a command by the user to change the current selection to one having a different value of this kind of meta-data (e.g. choose a new song not having meta-data <Tempo(Fast)>). The interface can respond to the user's choice of "new song" (or, more generally "new content") by making a random selection from within the category indicated by the user or by making a selection which takes some user preferences into account. Such user preferences can be expressed explicitly or can be determined automatically by the system (for example by compiling statistics relating to the user's past access to content).

In the above-described example, when an item of content is selected for accessing (playback, display, etc.) the mapped-meta-data widgets are mapped to the values of the meta-data applicable to the selected item. However, the invention is not limited to this method for determining which is the "currently-applicable" attribute-value to be mapped to a given widget. Other possibilities include: mapping widgets to the attribute-value applicable to: the item of content to which (at the current time) the user has given his top ranking, the most-played item of content, the item of content most recently added to the user's collection, etc.

In preferred embodiments of the invention, the graphical element representing a widget mapped to the meta-data of a currently-selected item of content is an image representative of that meta-data (e.g. for meta-data <Perfomer(Rolling Stones)>a photo of the band "Rolling Stones" could be use as the graphical element currently representing this widget. As the item of content that is "currently selected" changes, there may be a change in the value of a particular kind of meta-data which has an associated mapped-meta-data widget. The graphical element representing that widget will change accordingly. For example, if the currently-selected song changes from "Satisfaction" having <Perfomer(Rolling Stones)>to "Twist and Shout" having <Perfomer(The Beatles)>, the graphical element representing the mapped-meta-data widget associated with the <performer>meta-data of the currently-selected song could change to show a photograph of the Beatles.

FIG. 5B is a photograph of a screen display obtained during use of a music-browsing interface according to one embodiment of the invention. As shown in the screen display of FIG. 5B, two mapped-meta-data widgets are active, one relating to the genre of a currently-selected music item, and one related to the composer of the currently-selected music item. More specifically, at the time when this photograph was taken, a piece of music by Frederic Chopin was selected, thus, one widget was mapped to the meta-data "Genre(Classical)>and the other to <Composer(Chopin, Frederic)>.

The screen display shown in FIG. 5B indicates that the user is moving her finger over the graphical representation of the widget mapped to <Genre(Classical)>. In the illustrated example, the controller for this widget is designed to respond to operation of the widget by commanding selection of another piece of music having meta-data <Genre(Classical)>.

Incidentally, a mapped-meta-data widget may be selectively-activatable, for example only becoming active when the interface is in a particular operating mode, say, Mode B shown in FIGS. 4B and 4C. It can be necessary to have a mechanism for setting values for meta-data to be mapped to the mapped-meta-data widgets, MMW, at the time when Mode B becomes activated. In certain preferred embodiments of the invention, when the user operates a mode-selector widget to select e.g. Mode B, the meta-data of the currently-selected item of content (i.e. selected at the time of the mode change) will determine the meta-data to which the meta-data-mapped widgets are mapped.

For example:
if the user changes from operating mode A (FIG. 4A) to operating mode B (FIG. 4B) while the song "Twist and Shout" is a currently-selected item of content, the three meta-data-mapped widgets of FIG. 4B could be mapped to <Country(United Kingdom)><Genre(Pop)><Performer(The Beatles)>, respectively, and graphical elements representing the British flag, an icon for "pop" and a photograph of the Beatles could be used to represent the widgets; and
if the user changes from operating mode B (FIG. 4B) to operating mode A (FIG. 4A) while the song "Twist and Shout" is the currently-selected item of content, the scrollable-list widget (which can be a meta-data-mapped widget) may display a list of titles of other songs having meta-data <Performer(The Beatles)>, or a list of names of other performers for content having <Genre (Pop)>, etc.—the attribute whose values are included in the scrollable list will be determined by the widget's controller (and may be dependent upon how the user has configured the interface).

FIG. 4C illustrates the case where a user has operated the placeholder widget, PHW, of FIG. 4B so as to invoke a slider widget SW. FIG. 5C is a photograph of a display screen in a music-browser interface according to one embodiment of the invention, showing such a slider widget being operated. In this example, the user is operating the slider widget by placing the on-screen image of her hand on the top of the sliding element (the filler within the overall slider boundary) and pushing it down, virtually. In this example, the result of the user's operation of this slider widget is a gradual reduction in the volume of an audio file that is being played back.

The particular selection of widgets to be used in a content-management interface according to the present invention, as well as the number and type of operating modes, and the graphical elements to be displayed (in each mode), vary tremendously depending upon the application and the wishes of the designer and/or user (depending upon the extent to which the interface is configurable by the end-user). It should be noted that interfaces according to the invention can also display on the display screen graphical elements which do not correspond to widgets operable by virtual actions of the user's on-screen image. For example, as shown in the photograph of FIG. 6, the display screen can display text (in this case the title and performer of a currently-selected song). As another example, the interface could display elements which are operable by some action of the user other than virtual actions of his on-screen image—e.g. elements which require selection using a pointing device (e.g. mouse), touch screen, tablet, etc.

To sum up the above explanation, it is considered helpful to provide an outline of the operation of a music-browser interface based on FIG. 2 and FIGS. 4A to 4C, as an example of an application of a content-management interface embodying the present invention.

It shall be assumed that, at start-up, the content-management interface displays a screen based on FIG. 4B but also displaying a real-time image of the user as provided by an imaging device. A song, for example "A Little Less Conversation" by Elvis Presley, is selected at random and is automatically played back. Because the interface is operating in mode B, three icons are displayed at the top of the screen, representing three predetermined types of meta-data having the values applicable to the song currently-being played back, say, <Performer's Country(United States of America)>at the top, left-hand side of the screen, <Genre(Pop)>at the top, centre of the screen and <Performer(Elvis Presley)>at the top, right-hand side of the screen. A button bearing the word "Pause" is displayed at the bottom of the screen so as to represent a toggling play/pause playback-control widget (the word on the displayed button changes to "Play" if the user moves so as to activate this widget and pause playback of the current song).

If the user wishes to hear a song having the same Genre as the current one (but does not mind whether the performer and performer's country are different from the current selection), he moves so that the image of his hand presses the top-centre button (whose widget is currently mapped to <Genre(Pop)>. The widget represented by this top-centre button responds by causing a song to be selected at random from the available songs having <Genre(Pop)>. As an example, suppose that the song "Billie Jean" by Michael Jackson is selected; playback of this song begins automatically (and playback of the previously-selected song is discontinued).

If the user wishes to hear a song by a performer from the same country as the current one (but does not mind whether the performer or Genre are different from the current selection), he moves so that the image of his hand presses the top-left button (whose widget is currently mapped to <Performer's country(United States of America)>. The widget represented by this top-left button responds by causing a song to be selected at random from the available songs having <Performer's country (United States of America)>. As an example, suppose that the song "(We're Going to) Rock Around The Clock" by Bill Haley and the Comets is selected; playback of this song begins automatically.

If the user wishes to hear a song having the same Performer as the current one (but does not mind whether the Genre is different from the current selection), he moves so that the image of his hand presses the top-right button (whose widget is currently mapped to <Performer(Bill Haley and The Comets)>. The widget represented by this top-right button responds by causing a song to be selected at random from the available songs having <Performer's country (United States of America)>. As an example, suppose that the song "See You Later, Alligator" by Bill Haley and The Comets is selected; playback of this song begins automatically.

It may be that the user wishes to select a particular song by this artist and he knows that there is an alternative operating mode (Mode A) of the interface available which will make this possible (via a scrolling list of the titles of songs by the performer of the currently-selected song). Two buttons representing mode-selector widgets for mode A and mode B, respectively, are displayed towards the left-hand side of the screen. The user moves so that the displayed image of his hand presses the button representing operating mode A.

As a result of the user's action, the widget represented by the button for mode A causes a screen based on FIG. 4A to be displayed (with the image of the user superimposed). The buttons representing the three meta-data mapped widgets no longer appear. Instead, a scrolling list appears at the top of the screen, showing the titles of all the available songs by Bill Haley and the Comets. When the user sees the title of the song he desires scroll to the centre of the screen, he moves so that the displayed image of his hand touches that title. The widget represented by the scrolling list causes the scrolling of the list to stop and causes the song with the selected title to be played back automatically.

If the user wishes to decrease (increase) the volume of the song currently being played back, he moves so that the image of his hand presses the button at the right-hand side of the screen, representing the placeholder widget. The placeholder widget responds by causing the graphical representation of the placeholder widget to disappear and causing the graphical representation of a slider widget to appear, as in FIG. 4C. The user moves his hand so that its displayed image rests on the top (bottom) of the sliding element (i.e. at the interface between the shaded and white portions of SW in FIG. 4C) and he moves so that the displayed image of his hand slides the slider up (down). The slider widget controls the playback of the currently-selected song so as to change its volume accordingly.

The techniques of the present invention can be extended by introducing gesture-based controls. In other words, the interface can include means for analyzing the image of the user whereby to determine whether or not the user is making one of a predefined set of gestures—for example, a "thumbs-down" gesture (to indicate "change to something different from the current selection"), a hand gesture with the palm facing downwards and downward motion (to indicate "reduce volume"), etc. When one of the predetermined gestures is detected, a corresponding gesture-based controller takes action so as to perform the function associated with that gesture. Numerous techniques have been proposed for recognizing gestures and the present invention is not limited with regard to which technique is adopted.

Although the present invention has been described above with reference to the detailed features of certain preferred embodiments thereof, the skilled person will readily appreciate that modifications, replacements and adaptations can be made therein without departing from the scope of the present invention as defined in the accompanying claims.

For example, although the above-described preferred embodiments concern content-management interfaces in which graphical elements are displayed associated with widgets, it is to be understood that these graphical elements are not essential. In other words, a widget could be defined having an operable area at a particular on-screen location, but no graphical element indicating that location is displayed on the screen.

In this context, it should be recalled that the graphical elements are provided so as to give the user a visual reference as to where he should move his on-screen image so as to operate a given widget. In other words, the graphical elements act as an aide-memoire with regard to the location of the operable area applicable to each widget, something which renders use of the interface simple and which is particularly valuable when there is a large number if widgets. However, it is possible to envisage the case where the user can memorize the operable areas for a small number of widgets having well-spaced operable areas (e.g. top-of-screen, bottom-left of screen and bottom-right of screen) thus dispensing with the need for graphical representations of those widgets.

To allow an easier interaction between a user and the interface, the system can be adapted such that the camera (or other imaging device detecting the user) can follow the user and focus on him.

Optionally, systems embodying the present invention can be designed to learn from experience (for example, learning the user's preferences so as to take them into account when selecting new content in response to a user command), learn to recognize users, and (if gesture-recognition is supported) learn new gestures.

At start-up of an interface according to the present invention, the system may make a selection of an item of content to be accessed and presented to the user (e.g. automatic playback of a song, automatic display of an image, etc.). However, this is not mandatory; the interface may await specific action by the user before any particular item of content is accessed/presented.

The invention claimed is:

1. A user-interface for a content-management system, the user-interface being for inputting and responding to user commands whereby to cause one or more content-management functions to be performed on one or more items of content accessible via said content-management system, each said item of content being described by a set of meta-data, each item of meta-data of said set defining a respective attribute and a value for said attribute when describing said item of content, said one or more content-management functions notably including one or more operations selected in the group consisting of: selecting, accessing, searching, modifying, and presenting an item of content, adding and deleting an item of content from a collection, and selecting, accessing, searching, modifying, and presenting a data structure defining the organisation of a collection of said items of content, the user interface comprising:

means for capturing a video stream including an image of a user;

display means for preparing video data to cause an image corresponding to said video stream to be displayed on a screen;

control means defining at least a first association between a respective first region of said display screen and a respective first content-management function, said first content-management function being dependent on a variable value of a first attribute defined by meta-data, the control means being adapted to register whether a given association between a display screen region and a content-management function is active, wherein the first association defined by the control means is an association between an elongate region of the display screen and a particular content-management function for varying the value of a given attribute of items of content, said given attribute taking a continuous range of values, and the control means is adapted such that when said particular content-management function is caused to be implemented, the variation in value produced by said content-management function depends on characteristics of user motion detected within the video stream displayed on said elongate region; and motion-detection means for detecting the user motion in a respective portion of said video stream to be displayed at said region of said display screen;

wherein the control means is adapted such that, when, at a first time, the motion-detection means detects user motion in a portion of said video stream to be displayed at said first region of said display screen, the first association being active at said first time, the control means will cause said first content-management function to be implemented dependent on a first value of said first attribute, said first value being the value applicable to said first attribute at said first time.

2. An interface according to claim 1, wherein the control means is adapted to use, as said first value, the value of said first attribute applicable to the item of content selected at said first time.

3. An interface according to claim 2, wherein the control means is adapted to cause implementation, at said first time, of a content-management function comprising comparison of the value of said first attribute of said item of content selected at said first time with the value of said first attribute applicable to other of said accessible items of content.

4. An interface according to claim 1, 2 or 3, wherein the control means comprises a graphical data generator adapted to generate a graphical element for display on said display screen at a region associated with a function defined by said control means.

5. An interface for a content-management system, the interface being for inputting and responding to user commands whereby to cause one or more content-management functions to be performed on one or more items of content accessible via said content-management system, each said item of content being described by a set of meta-data, each item of meta-data of said set defining a respective attribute and a value for said attribute when describing said item of content, said one or more content-management functions notably including one or more operations selected in the group consisting of: selecting, accessing, searching, modifying, and presenting an item of content, adding and deleting an item of content from a collection, and selecting, accessing, searching, modifying, and presenting a data structure defining the organisation of a collection of said items of content, the interface comprising:

means for capturing a video stream including an image of a user;

display means for preparing video data to cause an image corresponding to said video stream to be displayed on a screen;

control means defining at least a first association between a respective first region of said display screen and a respective first content-management function, said first content-management function being dependent on a variable value of a first attribute defined by meta-data, the control means being adapted to register whether a given association between a display screen region and a content-management function is active; and motion-detection means for detecting user motion in a respective portion of said video stream to be displayed at said region of said display screen;

wherein the control means is adapted such that, when, at a first time, the motion-detection means detects user motion in a portion of said video stream to be displayed at said first region of said display screen, the first association being active at said first time, the control means will cause said first content-management function to be implemented dependent on a first value of said first attribute, said first value being the value applicable to said first attribute at said first time, wherein the first association defined by the control means is an association between a listing region of the display screen and a content-management function involving selection from a list;

a graphical representation of said list, capable of scrolling, is displayed on said display screen when said first content-management function is activated; and when the motion-detection means detects user motion in a portion of the video stream corresponding to a predetermined area in said listing region, a list-selection content-management function causes selection of the list item whose graphical representation is being displayed at said predetermined area of the display screen.

6. An interface according to claim 4, wherein the graphical data generator is adapted to generate a graphical element representing a slider in respect of said particular content-management function for varying an attribute-value.

7. An interface according to any one of claims 1-3, wherein no graphical element is displayed on said display screen in respect of a content-management function that is not active.

8. An interface according to any one of claims 1-3, wherein at least two associations defined by the control means are a pair of complementary functions which are activated and deactivated in anti-phase, wherein a first of the complementary functions is a placeholder function and the control means is adapted to deactivate said placeholder function when the motion-detection means detects user motion in a portion of the video stream to be displayed in the region associated with said placeholder function.

9. An interface according to claim 8, wherein the control means is adapted to deactivate the second of said complementary functions a predetermined interval after the motion-detection means ceases to detect user motion in a portion of the video stream to be displayed in the region associated with said second complementary function.

10. An interface according to claim 5, wherein at least one of the associations defined by the control means is an association between an elongate region of the display screen and a particular content-management function for varying the value of a given attribute of items of content, said given attribute taking a continuous range of values, and wherein the control means is adapted such that when said particular content-management function is caused to be implemented, the variation in value produced by said content-management function depends on characteristics of the user motion detected within said elongate region.

11. An interface according to claim 5, wherein, when the motion-detection means detects user motion in a portion of the video stream corresponding to an extremity of said listing region, the graphical representation of said list scrolls towards or away from said extremity of the listing region.

12. A content-management system comprising a user-interface according to any one of claims 1 to 3.

13. A content-browser comprising a user-interface according to any one of claims 1 to 3.

14. A method of managing interaction between a user and a content-management system, comprising the steps of:
capturing a video stream including an image of a user;
preparing video data for causing an image corresponding to said video stream to be displayed on a screen;
defining at least a first association capable of being invoked between a respective first region of said display screen and a respective first content-management function, said first content-management function being dependent on a variable value of a first attribute defined by meta-data, wherein the first association is an association between an elongate region of the display screen and a particular content-management function for varying the value of a given attribute of items of content, said given attribute taking a continuous range of values, and, when said particular content-management function is caused to be implemented, the variation in value produced by said content-management function depends on characteristics of user motion detected within the video stream displayed on said elongate region;
detecting the user motion in a respective portion of said video stream to be displayed at said first region of said display screen; and
causing said first content-management function to be implemented when, at a first time, user motion is detected in a portion of said video stream to be displayed at said first region of said display screen, said first association being active at said first time;
wherein the first content-management function is implemented at said first time in a manner dependent on a first value of said first attribute, said first value being the value applicable to said first attribute at said first time.

15. A computer system arranged to perform the steps of:
capturing a video stream including an image of a user;
preparing video data for causing an image corresponding to said video stream to be displayed on a screen;
defining at least a first association capable of being invoked between a respective first region of said display screen and a respective first content-management function, said first content-management function being dependent on a variable value of a first attribute defined by meta-data, wherein the first association is an association between an elongate region of the display screen and a particular content-management function for varying the value of a given attribute of items of content, said given attribute taking a continuous range of values, and, when said particular content-management function is caused to be implemented, the variation in value produced by said content-management function depends on characteristics of user motion detected within the video stream displayed on said elongate region;
detecting the user motion in a respective portion of said video stream to be displayed at said first region of said display screen; and
causing said first content-management function to be implemented when, at a first time, user motion is detected in a portion of said video stream to be displayed at said first region of said display screen, said first association being active at said first time;
wherein the first content-management function is implemented at said first time in a manner dependent on a first value of said first attribute, said first value being the value applicable to said first attribute at said first time.

16. A non-transitory medium encoded with a computer program having a set of instructions which, when in use on a general purpose computer, cause the computer to perform the steps of:

capturing a video stream including an image of a user;

preparing video data for causing an image corresponding to said video stream to be displayed on a screen;

defining at least a first association capable of being invoked between a respective first region of said display screen and a respective first content-management function, said first content-management function being dependent on a variable value of a first attribute defined by meta-data, wherein the first association is an association between an elongate region of the display screen and a particular content-management function for varying the value of a given attribute of items of content, said given attribute taking a continuous range of values, and, when said particular content-management function is caused to be implemented, the variation in value produced by said content-management function depends on characteristics of the user motion detected within the video stream displayed on said elongate region;

detecting the user motion in a respective portion of said video stream to be displayed at said first region of said display screen; and causing said first content-management function to be implemented when, at a first time, user motion is detected in a portion of said video stream to be displayed at said first region of said display screen, said first association being active at said first time;

wherein the first content-management function is implemented at said first time in a manner dependent on a first value of said first attribute, said first value being the value applicable to said first attribute at said first time.

17. A method of managing interaction between a user and a content-management system, comprising the steps of:

capturing a video stream including an image of a user;

preparing video data for causing an image corresponding to said video stream to be displayed on a screen;

defining at least a first association capable of being invoked between a respective first region of said display screen and a respective first content-management function, said first content-management function being dependent on a variable value of a first attribute defined by meta-data, wherein the first association is an association between a listing region of the screen and a content-management function involving selection from a list, wherein a graphical representation of said list, capable of scrolling, is displayed on said screen when said content-management function is activated, and, when a motion detector detects user motion in a portion of the video stream corresponding to a predetermined area in said listing region, a list-selection content-management function causes selection of the list item whose graphical representation is being displayed at said predetermined area of the screen;

detecting user motion in a respective portion of said video stream to be displayed at said first region of said display screen; and causing said first content-management function to be implemented when, at a first time, user motion is detected in a portion of said video stream to be displayed at said first region of said display screen, said first association being active at said first time;

wherein the first content-management function is implemented at said first time in a manner dependent on a first value of said first attribute, said first value being the value applicable to said first attribute at said first time.

18. A computer system arranged to perform the steps of:

capturing a video stream including an image of a user;

preparing video data for causing an image corresponding to said video stream to be displayed on a screen;

defining at least a first association capable of being invoked between a respective first region of said display screen and a respective first content-management function, said first content-management function being dependent on a variable value of a first attribute defined by meta-data, wherein the first association is an association between a listing region of the screen and a content-management function involving selection from a list, wherein a graphical representation of said list, capable of scrolling, is displayed on said screen when said content-management function is activated, and, when a motion detector detects user motion in a portion of the video stream corresponding to a predetermined area in said listing region, a list-selection content-management function causes selection of the list item whose graphical representation is being displayed at said predetermined area of the screen;

detecting user motion in a respective portion of said video stream to be displayed at said first region of said display screen; and causing said first content-management function to be implemented when, at a first time, user motion is detected in a portion of said video stream to be displayed at said first region of said display screen, said first association being active at said first time;

wherein the first content-management function is implemented at said first time in a manner dependent on a first value of said first attribute, said first value being the value applicable to said first attribute at said first time.

19. A non-transitory medium encoded with a computer program having a set of instructions which, when in use on a general purpose computer, cause the computer to perform the steps of:

capturing a video stream including an image of a user;

preparing video data for causing an image corresponding to said video stream to be displayed on a screen;

defining at least a first association capable of being invoked between a respective first region of said display screen and a respective first content-management function, said first content-management function being dependent on a variable value of a first attribute defined by meta-data, the first association is an association between a listing region of the screen and a content-management function involving selection from a list, wherein a graphical representation of said list, capable of scrolling, is displayed on said screen when said content-management function is activated, and, when a motion detector detects user motion in a portion of the video stream corresponding to a predetermined area in said listing region, a list-selection content-management function causes selection of the list item whose graphical representation is being displayed at said predetermined area of the screen;

detecting user motion in a respective portion of said video stream to be displayed at said first region of said display screen; and causing said first content-management function to be implemented when, at a first time, user motion is detected in a portion of said video stream to be displayed at said first region of said display screen, said first association being active at said first time;

wherein the first content-management function is implemented at said first time in a manner dependent on a first value of said first attribute, said first value being the value applicable to said first attribute at said first time.

\* \* \* \* \*